United States Patent
Byron et al.

(10) Patent No.: US 6,421,743 B1
(45) Date of Patent: Jul. 16, 2002

(54) METHOD AND SYSTEM FOR DATA TRANSFORMATION IN A COMPUTER NETWORK

(75) Inventors: David Morris Byron, San Francisco; Edward L Koch, San Rafael, both of CA (US)

(73) Assignee: Coactive Networks, Inc., Sausalito, CA (US)

( * ) Notice: Subject to any disclaimer, the term of this patent is extended or adjusted under 35 U.S.C. 154(b) by 0 days.

(21) Appl. No.: 09/404,397

(22) Filed: Sep. 23, 1999

(51) Int. Cl.[7] .......................... G06F 3/00; G06F 13/12; G06F 13/38
(52) U.S. Cl. ................ 710/3; 710/7; 710/8; 710/11; 710/72
(58) Field of Search .............................. 709/221, 229, 709/246; 710/3, 8, 11, 15, 72, 7, 9, 62, 129

(56) References Cited

U.S. PATENT DOCUMENTS

| | | | | |
|---|---|---|---|---|
| 4,500,933 A | * | 2/1985 | Chan | 360/69 |
| 5,237,693 A | * | 8/1993 | Kiyohara et al. | 709/229 |
| 5,457,784 A | * | 10/1995 | Wells et al. | 710/9 |
| 5,831,848 A | * | 11/1998 | Rielly et al. | 364/132 |
| 5,938,757 A | * | 8/1999 | Bertsch | 712/36 |
| 5,948,076 A | * | 9/1999 | Anubolu et al. | 710/8 |
| 5,964,852 A | * | 10/1999 | Overton | 710/62 |
| 6,035,105 A | * | 3/2000 | McCloghrie et al. | 395/200.66 |
| 6,088,755 A | * | 7/2000 | Kobayashi et al. | 710/129 |
| 6,092,078 A | * | 7/2000 | Adolfsson | 707/102 |
| 6,195,788 B1 | * | 2/2001 | Leaver et al. | 716/18 |
| 6,219,699 B1 | * | 4/2001 | McCloghrie et al. | 709/221 |
| 6,256,676 B1 | * | 7/2001 | Taylor et al. | 709/246 |

FOREIGN PATENT DOCUMENTS

JP 406169315 A * 6/1994

* cited by examiner

Primary Examiner—Thomas Lee
Assistant Examiner—Chun Cao
(74) Attorney, Agent, or Firm—Sawyer Law Group LLP

(57) ABSTRACT

The present invention provides a method and system for data transmission in a computer network. The method includes sending data with a first structure to a connector, the connector coupled between the front-end and the back-end, the data being either from the front-end or the back-end; and mapping the data to a second structure by the connector, such that a change in a configuration of at least one control point at the back-end is transparent to the front-end. In the preferred, the method includes an additional device, a connector, that serves as a gateway between the enterprise and the control network. The enterprise defines structures, data points, that it prefers to use and configures the gateway to use them. From then on, communication between the enterprise and the connector uses those structures. The enterprise also configures the gateway to communicate with the desired elements of the control network by defining input/output points. The enterprise never communicates directly with the control network and so it does not need to be aware of the details of that communication. Messages containing information about control points transmitted between the back-end and the connector are isolated from data points transmitted between the connector and the front-end. This transparency provides the network with more flexibility and reduces the cost of operating the network. It allows for the front-end to use an open standard which further increases the flexibility of the network, and the enterprise to use whatever structures it desires, independent of the details of the control network implementation.

17 Claims, 5 Drawing Sheets

METHOD AND SYSTEM FOR DATA TRANSFORMATION IN A COMPUTER NETWORK

FIELD OF THE INVENTION

The present invention pertains to computer networks, and more particularly to the transformation of data in a computer network.

BACKGROUND OF THE INVENTION

Many control functions are managed in a computer network environment. FIG. 1 illustrates a conventional network 100. The network comprises a control network 102 at one end and an enterprise 108 at the other end. The enterprise 108 may be a workstation or personal computer. The control network 102 comprises a plurality of devices 104. For example, the devices 104 may include controls for an air conditioning system, a motion sensor to detect when a room is occupied, a switch for a light in the room, a temperature sensor, and a security camera. Each device 104 has one or more control points defined by the vendors of the devices. The enterprise 108 is directly connected to the control network 102 in such a way that it typically becomes another node on the network 102, like the devices it is controlling. In this case, each machine in the enterprise 108 must be specifically outfitted with the hardware and software necessary to become a node. Enterprise network management staff do not often have the skills necessary to manage these additional elements and enterprise software authors will also need training to satisfy the additional requirements of communicating directly with the control network.

Software exists on the enterprise 108 to facilitate communication between its applications 110 and the control network 102. To communicate, they send messages to each other that contain information about control points. The enterprise 108 contains one or more applications 110 that process the information in the message from the control network 102 and determine the appropriate response. In order to process and respond to the message correctly, the applications 110 must be written specifically for the control points of the particular group of devices 104 at the control network 102 as well as for the platform on the enterprise 108. This requires an understanding of the details of devices 104 and their corresponding control points and of the protocol used by the control network 102. However, problems arise when the configuration of the control network 102 changes, for example when one or more of the devices 104 are replaced or upgraded. A new device may use different control points. When this occurs, the applications 110 must be rewritten to accommodate for the change. This is inflexible and cumbersome for the enterprise network manager. In addition, any change to the workstation dictated by the enterprise 108 must keep its connection to the control network 102 in mind. The software typically used to enable workstation communication to control networks is typically platform specific. As a result, the workstation(s) employed by the enterprise 108 to communicate with the control network 102 must be specially managed to ensure compatibility. This adds to the cost of operation for the network.

Another limitation of the architecture of FIG. 1 is that there must be a permanent connection between the control network 104 and the enterprise 108 for communication to take place. This isn't practical in many situations where the enterprise 108 may not be located in the same physical location as the control network 104. It may only be practical to connect the two for short periods of time.

Accordingly, there exists a need for a method and system of improved data transmission in a computer network. This method and system should provide flexibility to the network and reduce the cost of operation for the network. The present invention addresses such a need.

SUMMARY OF THE INVENTION

The present invention provides a method and system for data transmission in a computer network. The method includes sending data with a first structure to a connector, the connector coupled between the front-end and the back-end, the data being either from the front-end or the back-end; and mapping the data to a second structure by the connector, such that a change in a configuration of at least one control point at the back-end is transparent to the front-end. In the preferred, the method includes an additional device, a connector, that serves as a gateway between the enterprise and the control network. The enterprise defines structures, data points, that it prefers to use and configures the gateway to use them. From then on, communication between the enterprise and the connector uses those structures. The enterprise also configures the gateway to communicate with the desired elements of the control network by defining input/output points. The enterprise never communicates directly with the control network and so it does not need to be aware of the details of that communication. Messages containing information about control points transmitted between the back-end and the connector are isolated from data points transmitted between the connector and the front-end. This transparency provides the network with more flexibility and reduces the cost of operating the network. It allows for the front-end to use an open standard which further increases the flexibility of the network, and the enterprise to use whatever structures it desires, independent of the details of the control network implementation.

DETAILED DESCRIPTION

The present invention provides a method and system for improved data transmission in a computer network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention allows changes to control points in the back-end to be transparent to the front-end. To more particularly describe the features of the present invention, please refer to FIGS. 2 through 5 in conjunction with the discussion below.

Figure 1:
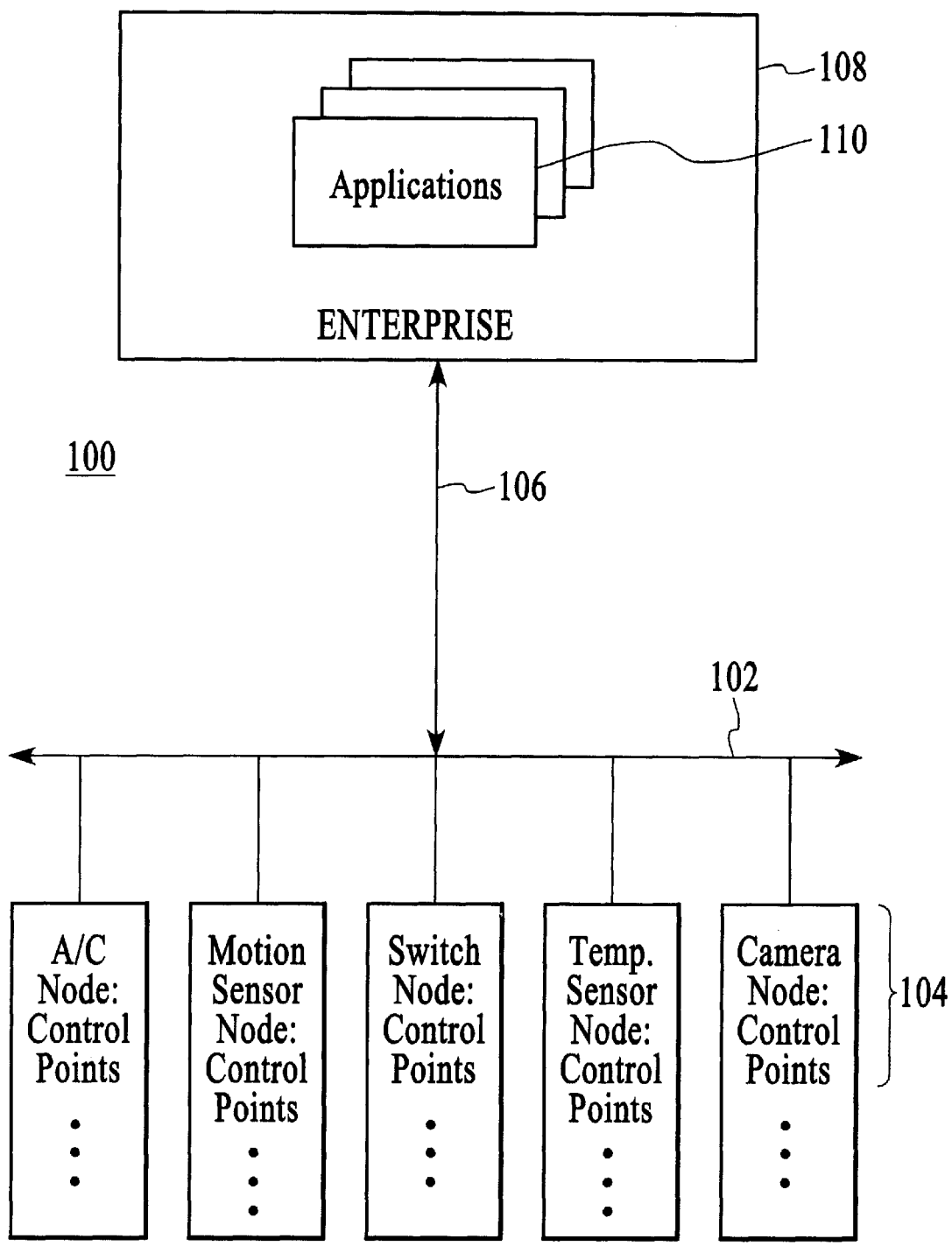
FIG. 1 illustrates a conventional computer network.
Figure 2:
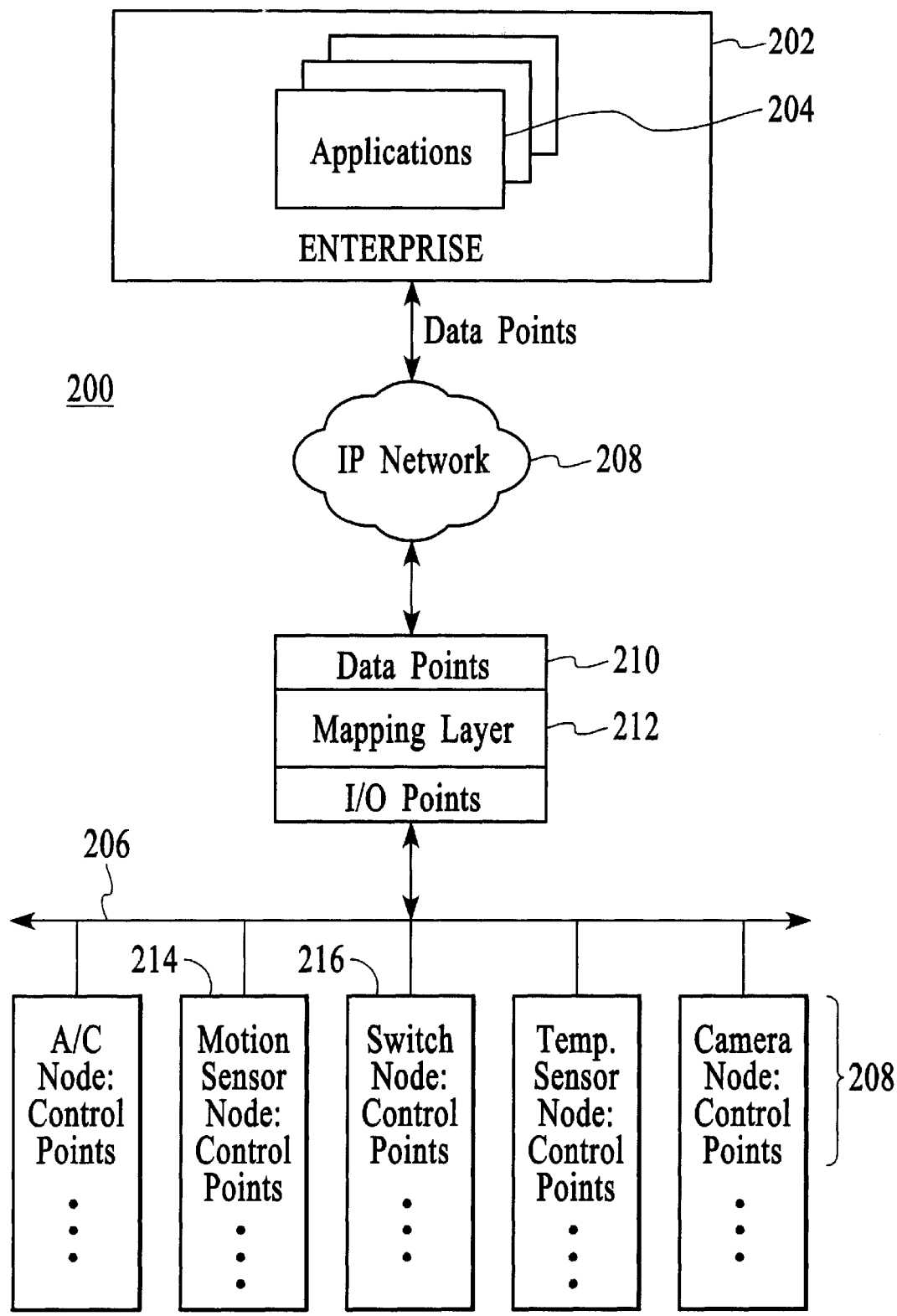
FIG. 2 illustrates a preferred embodiment of a computer network in accordance with the method and system of the present invention.

FIG. 2 illustrates a preferred embodiment of a computer network in accordance with the method and system of the present invention. At the-front-end, the network 200 comprises an enterprise 202 which contains one or more applications 204. At the back-end, the network 200 comprises a control network 206 which includes a plurality of devices 208. Between the front-end and the back-end is a connector 210 which comprises a mapping layer 212. The front end and the connector 210 communicate via an Internet Protocol network 208. In the preferred embodiment, the enterprise 202 configures data points on the connector 210 for communication with the front end. The enterprise 202 also configures input/output (I/O) points on the connector 210 so it can communicate with the desired control points on the back end. I/O points are the connector's 210 copy of the control points of the control network 206. Data points are pieces of data which the enterprise 202 creates that represent quantities in which the enterprise 202 is interested. The structure of the I/O points are isolated from the structure of the data points. To allow communication between the back and front ends, the preferred embodiment of the mapping layer 212 comprises software which maps I/O points to data points and vice versa. The mapping layer 212 is configured with the structures of the I/O and data points. When the enterprise 202 sends messages containing data points to the connector 210, the data points are mapped to corresponding I/O points by the mapping layer 212. Then messages containing the corresponding I/O points are forwarded to the control network 206. When I/O points on the connector 210 are updated through a variety of means, the mapping layer 212 first maps the I/O points to corresponding data points. The enterprise 202 can specify that these updates are logged for future retrieval, or that these updates should cause messages containing the corresponding data points to be immediately forwarded to the enterprise 202. Since the I/O points and data points are isolated from each other, the enterprise 202 is not required to know any specific information concerning I/O points in order to process or respond to messages from the back-end. A single consistent data structure may be used by the enterprise 202 which is applicable across all of the devices 208 at the back-end. When a change in the control points occur, the configuration of the mapping layer 212 can be changed accordingly if necessary. A change is not always required in the software in the enterprise 202 for each change in the control points. A change may be required to the configuration of I/O points, or to the actual mapping being performed, but the data points remain the same. Unlike the conventional network 100, the application 204 need not be rewritten each time a control point is changed. Thus, by providing the connector 210 with the mapping layer 212 in accordance with the present invention, changes in control points at the back-end are transparent to the front-end. Configuring the mapping layer 212 is considerably less costly than the rewriting of the applications 204, especially if the application 204 reside on numerous workstations. The enterprise 202 also need not deal with the proprietary protocol used by the control network 206 since this is taken into account by the mapping process. Thus, network administrators need not have an expertise in that protocol. The mapping module 212 may be provided by consultants with the expertise at time of installation of the connector 212 and occasionally when it needs to be updated. This significantly increases the flexibility of the network and reduces the cost of network operation. In addition, the enterprise 202 may use an open standard, such as CORBA (Common Object Request Broker Architecture), such that the enterprise 202 may communicate with the control network 206 even if the enterprise 202 has no knowledge of the proprietary protocol used by the control network 206. This further increases the flexibility of the network 200.

Figure 3:
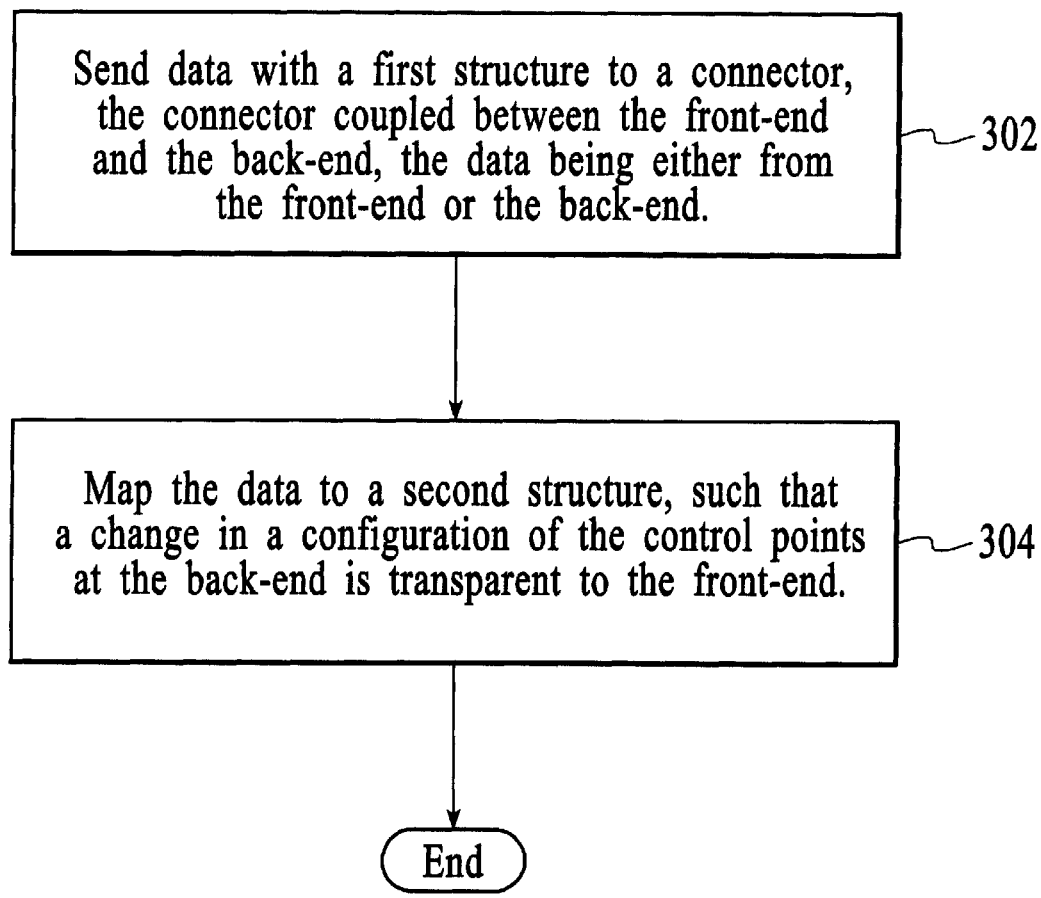
FIG. 3 is a flow chart illustrating a preferred embodiment of a method for data transmission in accordance with the present invention.

FIG. 3 is a flow chart illustrating a preferred embodiment of a method for data transmission in accordance with the present invention. First, data in a first structure is sent to a connector 210, which is coupled between the front-end and the back-end, via step 302. The data can be from either the front-end or the back-end. Then, the data is mapped to a second structure, such that a change in at least one control point at the back-end is transparent to the front-end, via step 304. The first and second structures are described in more detail in connection with the flow charts illustrated in FIGS. 4 and 5.

Figure 4:
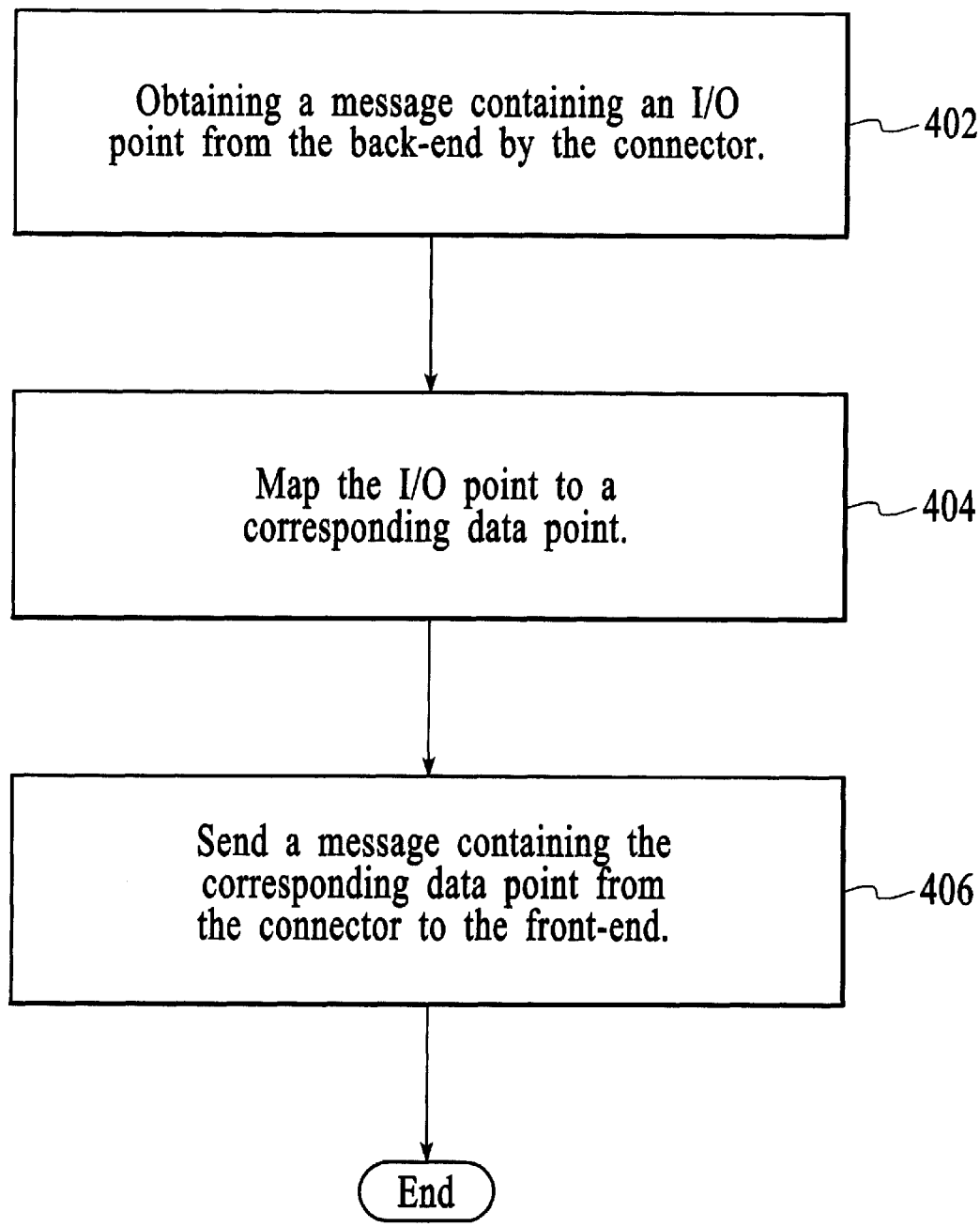
FIG. 4 is a flow chart illustrating in more detail the sending of data from the back-end to the front-end in accordance with the present invention as illustrated in FIG. 3.

FIG. 4 is a flow chart illustrating in more detail the sending of data from the back-end to the front-end in accordance with the present invention as illustrated in FIG. 3. First, a message containing an I/O point is obtained from the back-end by the connector 210, via step 402. The mapping layer 212 maps this I/O point to a corresponding data point, via step 404. Then, a message containing the corresponding data point is sent from the connector 210 to the front-end, via step 406. Thus, when data is sent from the back-end to the front end, the I/O point is the data in the first structure while the corresponding data point is the data in the second structure.

Figure 5:
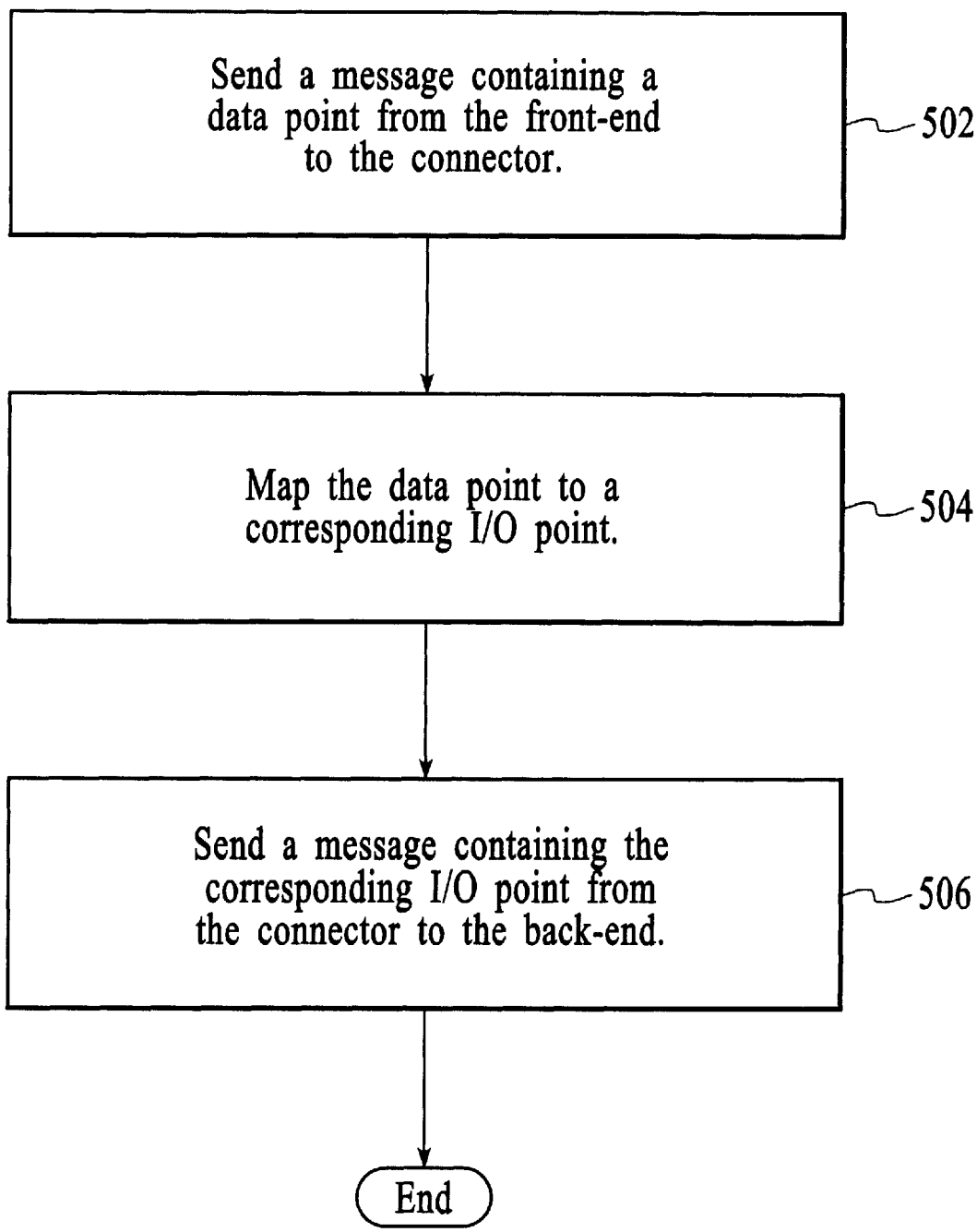
FIG. 5 is a flow chart illustrating in more detail the sending of data from the front-end to the back-end in accordance with the present invention as illustrated in FIG. 3.

FIG. 5 is a flow chart illustrating in more detail the sending of data from the front-end to the back-end in accordance with the present invention as illustrated in FIG. 3. First, a message containing a data point is sent from the front-end to the connector 210, via step 502. Next, the data point is mapped to a corresponding I/O point by the mapping layer 212, via step 504. Then, a message containing the I/O point is sent from the connector 210 to the back-end, via step 506. Thus, when data is sent from the front-end by the back-end, the data point is the data in the first structure while the I/O point is the data in the second structure.

For example, assume that the control network 206 is configured to notify the connector 210 whenever certain control values change. Also assume that one of the changes the connector 210 is interested in is when a control point of the motion sensor 214 indicates that someone is in the room. When the control point indicates such, the motion sensor node 214 sends a message containing the value of the control point to the connector 210, via step 402, where it is received as an I/O point. The mapping layer 212 maps the I/O point to a corresponding data point, via step 404. The connector 210 would be configured to log this information, creating a record of when the room was occupied and when it was empty. The log may be maintained in a database (not shown) in the connector 210. When the enterprise 202 wants to retrieve this record, it makes a connection to the connector 210 and requests the information. The connector 210 sends the data point log to the enterprise 202, while it continues to monitor the occupancy of the room. Once the enterprise 202 receives this information it is free to process it as necessary.

In the example above, the same data points are used by the enterprise 108 even if the control points for the motion sensor 214 or the switch 216 change. The mapping layer 212 may change accordingly without the need to also change the application software 204 at the enterprise 202.

In addition to providing flexibility to the network 202, the mapping layer 212 in accordance with the present invention may also manipulate the I/O and data points in other ways while also performing the mapping described above. For example, translations, scaling, calculations, etc. may also be performed. This provides even greater flexibility to the network 200.

A method and system for improved data transmission in a computer network has been disclosed. The method and system allows changes in control points at the back-end to be transparent to the front-end. In the preferred, the method includes an additional device, a connector, that serves as a gateway between the enterprise and the control network. The enterprise defines structures, data points, that it prefers to use and configures the gateway to use them. From then on, communication between the enterprise and the connector uses those structures. The enterprise also configures the gateway to communicate with the desired elements of the control network by defining input/output points. The enterprise never communicates directly with the control network and so it does not need to be aware of the details of that communication. An additional configuration step is required to map the input/output points to data points. Messages containing information about control points transmitted between the back-end and the connector are isolated from the data points transmitted between the connector and the front-end. This transparency provides the network with more flexibility and reduces the cost of operating the network. It allows for the front-end to use an open standard which further increases the flexibility of the network. Specifically, it allows the enterprise to use whatever structures it desires, independent of the details of the control network implementation. If the connector also includes functionality to collect information about the control network as desired by the enterprise, the enterprise can periodically connect to the connector to retrieve this information instead of being permanently connected. Temporary connections are less expensive and more readily available, giving yet another advantage to this architecture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for data transmission in a computer network, the network including a front-end and a back-end, the front-end including an application, the back-end including an input/output (I/O) device, comprising the steps of:
   (a) sending an I/O point for the I/O device to a connector or sending a data point for the application to the connector, the connector coupled between the front-end and the back-end; and
   (b) mapping the I/O point to the data point by the connector or mapping the data point to the I/O point by the connector, wherein if a structure of the I/O point is changed, a structure of the data point need not be changed.

2. The method of claim 1, comprising:
   (a1) obtaining a message containing the input/output (I/O) point from the back-end by the connector; and
   (b1) mapping the I/O point to the data point.

3. The method of claim 2, further comprising:
   (c) sending a message containing the data point from the connector to the front-end.

4. The method of claim 1, comprising:
   (a1) sending a message containing the data point from the front-end to the connector; and
   (b1) mapping the data point to the I/O point.

5. The method of claim 4, further comprising:
   (c) sending a message containing the I/O point from the connector to the back-end.

6. A system, comprising:
   a front-end comprising an application, wherein the application utilizes a data point, wherein the data point represents a quantity in which the application is interested;
   a back-end comprising at least one I/O device, wherein the I/O device utilizes at least one I/O point, wherein the I/O point represents a control point of the I/O device; and
   a connector coupled between the front-end and the back-end, the connector capable of mapping the data point to the I/O point or the I/O point to the data point, wherein if a structure of the I/O point is changed, a structure of the data point need not be changed.

7. A method for data transmission in a computer network, the network including a front-end and a back-end, the front-end including an application, the back-end including an I/O device, comprising the steps of:
   (a) obtaining an I/O point for the I/O device by a connector, wherein the I/O point represents a control point of the I/O device; and
   (b) mapping the I/O point to a data point for the application by the connector, wherein the data point represents a quantity in which the application is interested, wherein if a structure of the I/O point is changed, a structure of the data point need not be changed.

8. The method of claim 7, further comprising:
   (c) sending the data point to the front-end.

9. The method of claim 7, wherein the sending step (a) comprises:
   (a1) obtaining a message containing the I/O point from the back-end by the connector.

10. A method for data transmission in a computer network, the network including a front-end and a back-end, the front-end including an application, the back-end including an I/O device, comprising the steps of:
    (a) sending a data point for the application to a connector, wherein the data point represents a quantity in which the application is interested; and
    (b) mapping the data point to an I/O point for the I/O device by the connector, wherein the I/O point represents a control point of the I/O device, wherein if a structure of the I/O point is changed, a structure of the data point need not be changed.

11. The method of claim 10, further comprising:
    (c) sending the I/O point to the back-end.

12. The method of claim 10, wherein the sending step (a) comprises:
    (a1) sending a message containing the data point from the front-end to the connector.

13. A method for data transmission in a computer network, the network including a front-end and a back-end, the front-end including an application, the back-end including an I/O device, comprising the steps of:

(a) obtaining a message containing at least one I/O point for the I/O device at the back-end by a connector, wherein the at least one I/O point represents a control point of the I/O device;

(b) mapping the at least one I/O point to at least one corresponding data point for the application, wherein the at least one corresponding data point represents a quantity in which the application is interested, wherein if a structure of the at least one I/O point is changed, a structure of the at least one corresponding data point need not be changed; and (c) sending a message containing the at least one corresponding data point from the connector to the front-end.

14. A method for data transmission in a computer network, the network including a front-end and a back-end, the front-end including an application, the back-end including an I/O device, comprising the steps of:

(a) sending a message containing at least one data point from front-end to a connector, wherein the at least one data point represents a quantity in which the application is interested;

(b) mapping the at least one data point to at least one corresponding I/O point for the I/O device, wherein the at least one corresponding I/O point represents a control data for the I/O device, wherein if a structure of the at least one corresponding I/O point is changed, a structure of the at least one data point need not be changed; and (c) sending a message containing the at least one corresponding I/O point from the connector to the back-end.

15. A computer readable medium with program instructions for data transmission in a computer network, the network including a front-end and a back-end, the front-end including an application, the back-end including an I/O device, the instructions for:

(a) receiving an I/O point for the I/O device or a data point for the application; and (b) mapping the I/O point to the data point by the connector or mapping the data point to the I/O point by the connector, wherein if a structure for the I/O point is changed, a structure for the data point need not be changed.

16. The method of claim 1, wherein the I/O point represents a control point of the I/O device.

17. The method of claim 1, wherein the data point represents a quantity in which the application is interested.

* * * * *